United States Patent
Yang

(10) Patent No.: US 8,538,925 B2
(45) Date of Patent: Sep. 17, 2013

(54) SYSTEM AND METHOD FOR BACKING UP TEST DATA

(75) Inventor: Yong-Sheng Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/425,435

(22) Filed: Mar. 21, 2012

(65) Prior Publication Data

US 2013/0110785 A1    May 2, 2013

(51) Int. Cl.
*G06F 7/00* (2006.01)
*G06F 17/30* (2006.01)

(52) U.S. Cl.
CPC .. *G06F 7/00* (2013.01); *G06F 17/30* (2013.01)
USPC .......................................... 707/640; 707/654

(58) Field of Classification Search
None
See application file for complete search history.

(56) References Cited

U.S. PATENT DOCUMENTS

| | | | | |
|---|---|---|---|---|
| 7,467,167 B2 * | 12/2008 | Patterson | ............................. | 1/1 |
| 7,469,289 B2 * | 12/2008 | Arakawa et al. | .............. | 709/224 |
| 7,774,391 B1 * | 8/2010 | Le et al. | ........................ | 707/822 |
| 2004/0153481 A1 * | 8/2004 | Talluri | .......................... | 707/200 |
| 2007/0198690 A1 * | 8/2007 | Kodama | ........................ | 709/223 |
| 2008/0104145 A1 * | 5/2008 | Lipman et al. | ................ | 707/204 |
| 2008/0115071 A1 * | 5/2008 | Fair | .............................. | 715/764 |

* cited by examiner

*Primary Examiner* — Jay Morrison
(74) *Attorney, Agent, or Firm* — Altis Law Group, Inc.

(57) ABSTRACT

In a method for backing up test data using a first backup device and a second backup device, backup times and storage paths for each test computing device in the first backup device and the second backup device, and a backup path of each test computing device are set. Test data of each of the test computing devices are backed up as backup data to the first backup device if a first current time of the first backup device matches the backup time in the first backup device, or to the second backup device if a second current time of the second backup device matches the backup time in the second backup device. Changes of each backup file of the backup data stored under the storage path are recorded. A log file of the backup time is generated.

12 Claims, 3 Drawing Sheets

SYSTEM AND METHOD FOR BACKING UP TEST DATA

BACKGROUND

1. Technical Field

Embodiments of the present disclosure relate to data backup systems and methods, and more particularly to a system and a method for backing up test data.

2. Description of Related Art

Backing up test data is very important. Generally, a backup device may backup the test data at a fixed time. If a fault occurs in the backup device, the test data cannot be backed up normally and timely. If one of test devices in the laboratory malfunctions, a test task in the laboratory may not be executed successfully. Furthermore, convenient access to the test data backup may be denied, and changes of the test data cannot be known well and conveniently for users.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 1:
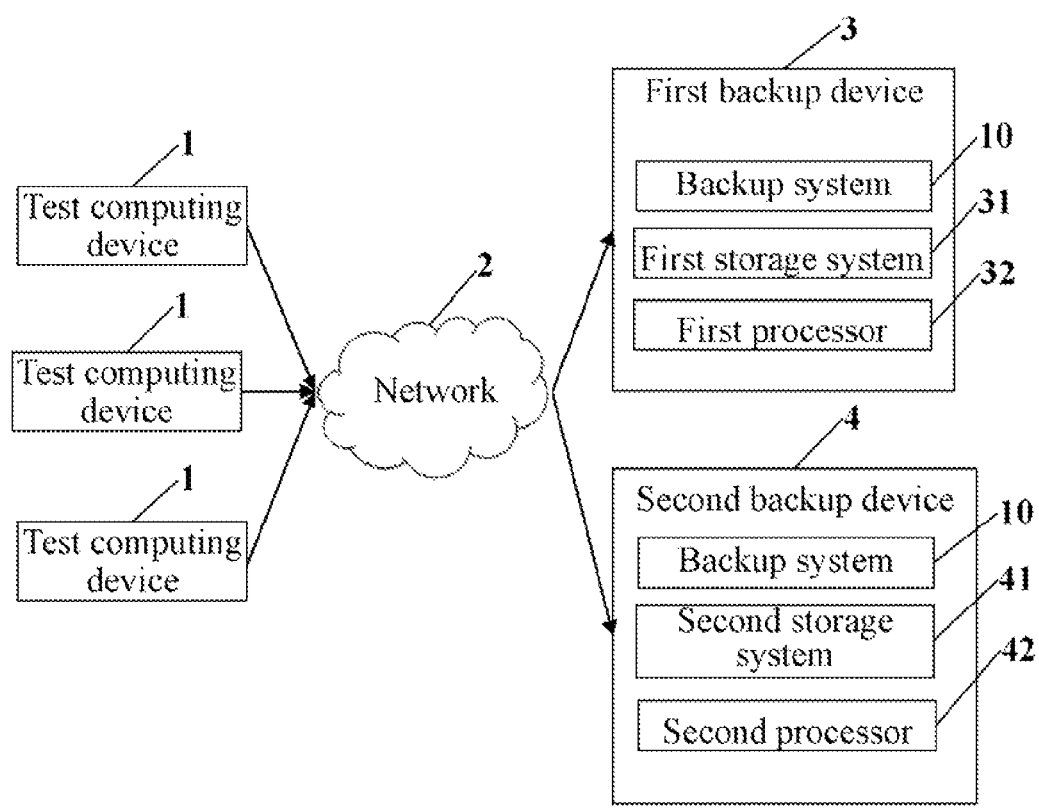
FIG. 1 is a block diagram of one embodiment of a first backup device and a second backup device.

FIG. 1 is a block diagram of one embodiment of a first backup device 3 and a second backup device 4. In one embodiment, both of the first backup device 3 and the second backup device 4 include a backup system 10. Both of the first backup device 3 and the second backup device 4 are connected to a plurality of test computing devices 1 through a network 2. Each of the test computing devices 1 includes test software that generates test data. In one embodiment, the first backup device 3 may be a backup computing device and may replace the test computing devices 1 for executing the test software. The second backup device 4 may be a backup server, for example. The backup system 10 may backup data backup on both of the first backup device 3 and the second backup device 4 at different time, and record changes of the test data backup.

The first backup device 3 includes a first storage system 31 and a first processor 32. The second backup device 4 includes a second storage system 41 and a second processor 42. The first storage systems 31 and second storage systems 41 store different kinds of data. The first storage system 31 and the second storage system 41 may be a memory, an external storage card, such as a smart media card, or a secure digital card. Both of the first and second processors 32 and 42 execute one or more computerized codes and other applications for corresponding devices, to provide the functions of the backup system 10.

Figure 2:
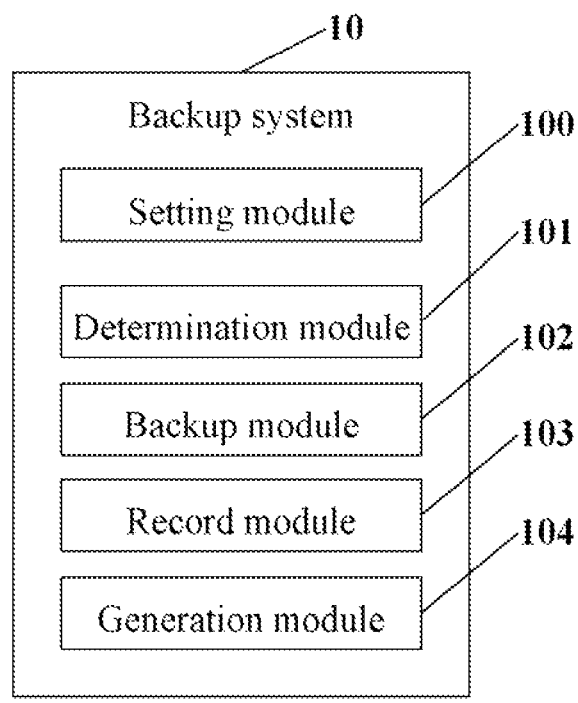
FIG. 2 is a block diagram of function modules of a backup system in the first backup device and the second backup device of FIG. 1.

FIG. 2 is a block diagram of function modules of the backup system 10 in the first backup device 3 and the second backup device 4 of FIG. 1. In one embodiment, the backup system 10 may include a setting module 100, a determination module 101, a backup module 102, a record module 103, and a generation module 104. The modules 100-104 comprise computerized codes in the form of one or more programs that are stored in each of the first storage system 31 and the second storage system 41. The computerized code includes instructions that are executed by the first processor 32 or by the second processor 42 to provide functions for the modules. Details of each of the modules are given in FIG. 3.

Figure 3:
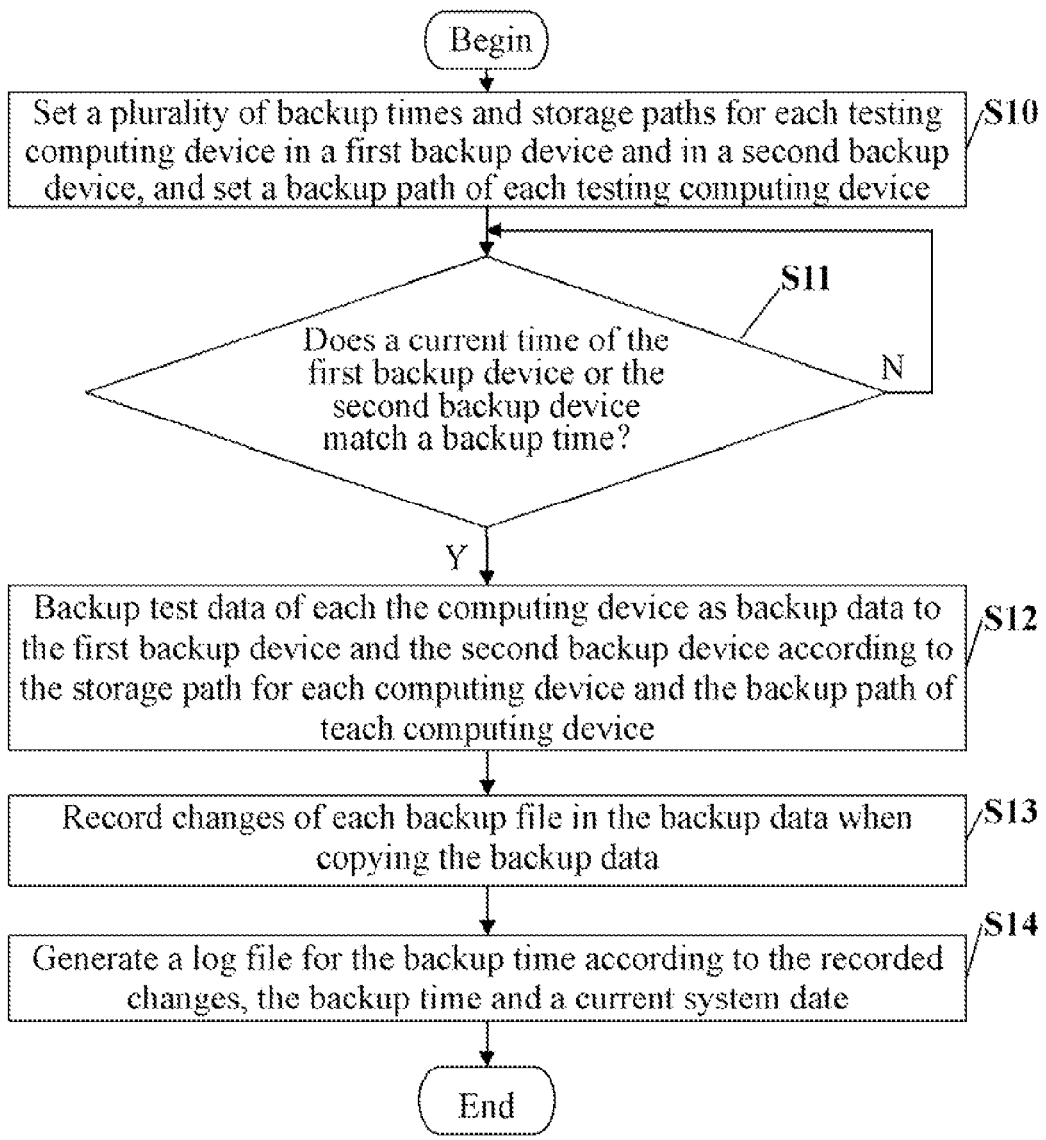
FIG. 3 is a flowchart of one embodiment of a method for backing up test data using the first backup device and the second backup device of FIG. 1.

FIG. 3 is a flowchart of one embodiment of a method for backing up test data using the computing device of FIG. 1. Depending on the embodiment, additional blocks may be added, others deleted, and the ordering of the blocks may be changed.

In block S10, the setting module 100 sets a plurality of backup times and storage paths for each of the test computing devices 1 in the first backup device 3 and in the second backup device 4, and sets a backup path of each of the test computing devices 1. The setting module 100 sets the storage paths and the backup paths according to an Internet Protocol (IP) address of each of the test computing devices 1. In some embodiments, the backup time in the first backup device 3 is different from the backup time in the second backup device 4. The backup time of each of the test computing devices 1 are preset according to available time of each of the test computing devices 1. The storage paths include a first storage path in the first backup device 3 and a second storage path in the second backup device 4 for storing the test data of each of the test computing devices 1 respectively. For example, if an IP address of a test computing device 1 is "10.162.194.18", the first storage path may be set to be "\\10.162.194.18\Test Data\2010TestDat\". The backup path of each of the test computing devices 1 represents that data under the backup path needs to be backed up to the first backup device 3 or the second backup device 4.

In block S11, the determination module 101 determines whether a first current time of the first backup device 3 matches a backup time of each of the test computing devices 1 in the first backup device 3, or a second current time of the second backup device 4 matches one backup time in the second backup device 4. For example, if a backup time of one of the test computing devices 1 in the first backup device 3 is set to be 12:35, the determination module 101 determines whether the current time of the first backup device 3 is equal to 12:35. If the first current time matches the backup time in the first backup device 3 or the second current time matches the backup time in the second backup device 4, block S12 is implemented. If neither the first current time matches the backup time in the first backup device 3 nor the second current time matches the backup time in the second backup device 4, block S11 is repeated.

In block S12, the backup module 102 backups test data of each of the test computing devices 1 as backup data to the first backup device 3 or to the second backup device 4. In one embodiment, the backup module 102 reads the test data of each of the test computing devices 1 as the backup data, and copies the backup data to the first backup device 3 or to the second backup device 4 according to the storage path of each of the test computing devices 1 in the first backup device 3 or the second backup device 4. If the first current time matches the backup time in the first backup device 3, the backup module 102 copies the backup data to the first backup device 3. If the second current time matches the backup time in the second backup device 4, the backup module 102 copies the backup data to the second backup device 4.

In block S13, the record module 103 records changes of each backup file of the backup data stored under the storage path, while copying the backup data to the first backup device 3 or to the second backup device 4. In one embodiment, the record module 103 records first backup files beginning with a first predetermined keyword, such as "Same", upon the condition that other files under the storage path have a same name and a same file size with the first backup files. The record module 103 records second backup files beginning with a second predetermined keyword, such as "Newer", upon the condition that other files under the storage path have a same name but a different file size with the second backup files. The record module 103 records third backup files beginning with a third predetermined keyword, such as "New", upon the condition that no file has a same name with the third backup files. The record module 103 records remainder files under the storage path beginning with a fourth predetermined keyword, such as "*Extra", upon the condition that no backup file has a same name with the remainder files. The record module 103 records the changes of each of the backup files including the storage path, the file size, and the name of the each of the backup files. Users can know and analyze the changes of the test data of each of the test computing devices 1 conveniently, according to the above-mentioned predetermined keywords.

In block S14, the generation module 104 generates a log file for the backup time of each of the test computing devices 1, according to the recorded changes, and stores the log file in the first storage system 31 or in the second storage system 41 according to a predetermined time period. In one embodiment, the predetermined time period may be seven days. The log file further includes the backup time and a system date of this backup time. For example, the log file may be named with the backup time and the system date for determining whether a backup operation of the first backup device 3 or the second backup device 4 has been executed. In one embodiment, if the first current time matches the backup time in the first backup device 3, the log file is stored in the first storage system 31, or if the second current time matches the backup time in the second backup device 4, the log file is stored in the second storage system 41.

All of the processes described above may be embodied in, and be fully automated via, functional code modules executed by one or more general-purpose processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

The invention claimed is:

1. A computer-implemented method for backing up data of a plurality of test computing devices using a first backup device and a second backup device, the method comprising:

setting a plurality of backup times and storage paths for each of the test computing devices in the first backup device and in the second backup device, and setting a backup path of each of the test computing devices; the storage paths and the backup path set according to an Internet Protocol (IP) address of each of the test computing devices;

backing up test data of each of the test computing devices as backup data to the first backup device according to the storage path in the first backup device and the backup path, upon the condition that a first current time of the first backup device matches the backup time in the first backup device, or backing up the test data as the backup data to the second backup device according to the storage path in the second backup device and the backup path, upon the condition that a second current time of the second backup device matches the backup time in the second backup device;

recording changes of each backup file of the backup data stored under the storage path, while backing up the test data, the changes being recorded by recording a first backup file that begins with a first keyword when another file under the storage path has a same name and a same file size with the first backup file; recording a second backup file that begins with a second keyword when another file under the storage path has a same name but a different file size with the second backup file; recording a third backup file that begins with a third keyword when no file under the storage path has a same name with the third backup file, and recording remainder files under the storage path that begins with a fourth keyword when no backup file has same names with the remainder files;

generating a log file for the backup time of each of the test computing devices according to the recorded changes, and storing the log file in a first storage system of the first backup device upon the condition that the first current time matches the backup time in the first backup device, or storing the log file in a second storage system of the second backup device upon the condition that the second current time matches the backup time in the second backup device.

2. The method as claimed in claim 1, wherein the changes of each backup file comprise the storage path, the file size, and the name of the each backup file.

3. The method as claimed in claim 1, wherein the log file comprises the backup time and a system date of this backup time, and the log file is stored periodically according to a predetermined time period.

4. The method as claimed in claim 1, wherein the backup times for each of the test computing devices in the first backup device are different from the backup time for each of the test computing devices in the second backup device.

5. A non-transitory computer readable storage medium storing a set of instructions, when executed by at least one processor of a computing device, cause the at least one processor to perform a method of backing up test data of a plurality of test computing devices using a first backup device and a second backup device, the method comprising:

setting a plurality of backup times and storage paths for each of the test computing devices in the first backup device and in the second backup device, and setting a backup path of each of the test computing devices, the storage paths and the backup path being set according to an Internet Protocol (IP) address of each of the test computing devices;

backing up test data of each of the test computing devices as backup data to the first backup device according to the storage path in the first backup device and the backup path, upon the condition that a first current time of the first backup device matches the backup time in the first backup device, or backing up the test data as the backup data to the second backup device according to the storage path in the second backup device and the backup path, upon the condition that a second current time of the second backup device matches the backup time in the second backup device;

recording changes of each backup file of the backup data stored under the storage path, while backing up the test data, the changes being recorded by recording a first backup file that begins with a first keyword when another file under the storage path has a same name and a same file size with the first backup file, recording a second backup file that begins with a second keyword when another file under the storage path has a same name but a different file size with the second backup file, recording a third backup file that begins with a third keyword when no file under the storage path has a same name with the third backup file, and recording remainder files under the storage path that begin with a fourth keyword when no backup file has same names with the remainder files;

generating a log file for the backup time of each of the test computing devices according to the recorded changes, and storing the log file in a first storage system of the first backup device upon the condition that the first current time matches the backup time in the first backup device, or storing the log file in a second storage system of the second backup device upon the condition that the second current time matches the backup time in the second backup device.

6. The non-transitory computer readable storage medium as claimed in claim 5, wherein the changes of each backup file comprise the storage path, the file size, and the name of the each backup file.

7. The non-transitory computer readable storage medium as claimed in claim 5, wherein the log file comprises the backup time and a system date of this backup time, and the log file is stored periodically according to a predetermined time period.

8. The non-transitory computer readable storage medium as claimed in claim 5, wherein the backup times for each of the test computing devices in the first backup device are different from the backup time for each of the test computing devices in the second backup device.

9. A backup device, comprising:
a storage system;
at least one processor; and
one or more programs that are stored in the storage system and executed by the at least one processor, the one or more programs comprising:
a setting module that sets a plurality of backup times and storage paths for each of the test computing devices communication in the backup device, and sets a backup path of each of the test computing devices, the storage paths and the backup path being set according to an Internet Protocol (IP) address of each of the test computing devices;
a backup module that backups test data of each of the test computing devices as backup data according to the storage path in the backup device and the backup path, upon the condition that a current time of the backup device matches the backup time for the each of the test computing devices in the backup device;
a record module that records changes of each backup file of the backup data stored under the storage path, while backing up data to the backup device, the changes being recorded by recording a first backup file that begins with a first keyword when another file under the storage path has a same name and a same file size with the first backup file, recording a second backup file that begins with a second keyword when another file under the storage path has a same name but a different file size with the second backup file, recording a third backup file that begins with a third keyword when no file under the storage path has a same name with the third backup file, and recording remainder files under the storage path that begin with a fourth keyword when no backup file has same names with the remainder files;
a generation module that generates a log file for the backup time of each of the test computing devices according to the recorded changes, and storing the log file in the storage system.

10. The backup device as claimed in claim 9, wherein the changes of each of backup files comprise the storage path, the file size, and the name of each of the backup files.

11. The backup device as claimed in claim 9, wherein the log file comprises the backup time and a system date of this backup time, and the log file is stored periodically according to a predetermined time period.

12. The backup device as claimed in claim 9, wherein the backup device is a backup computing device or a backup server.

* * * * *